April 28, 1931.   J. A. SHATZER ET AL   1,802,986
ELECTRICAL CURRENT CARRYING EQUIPMENT
Original Filed June 25, 1921   4 Sheets-Sheet 1
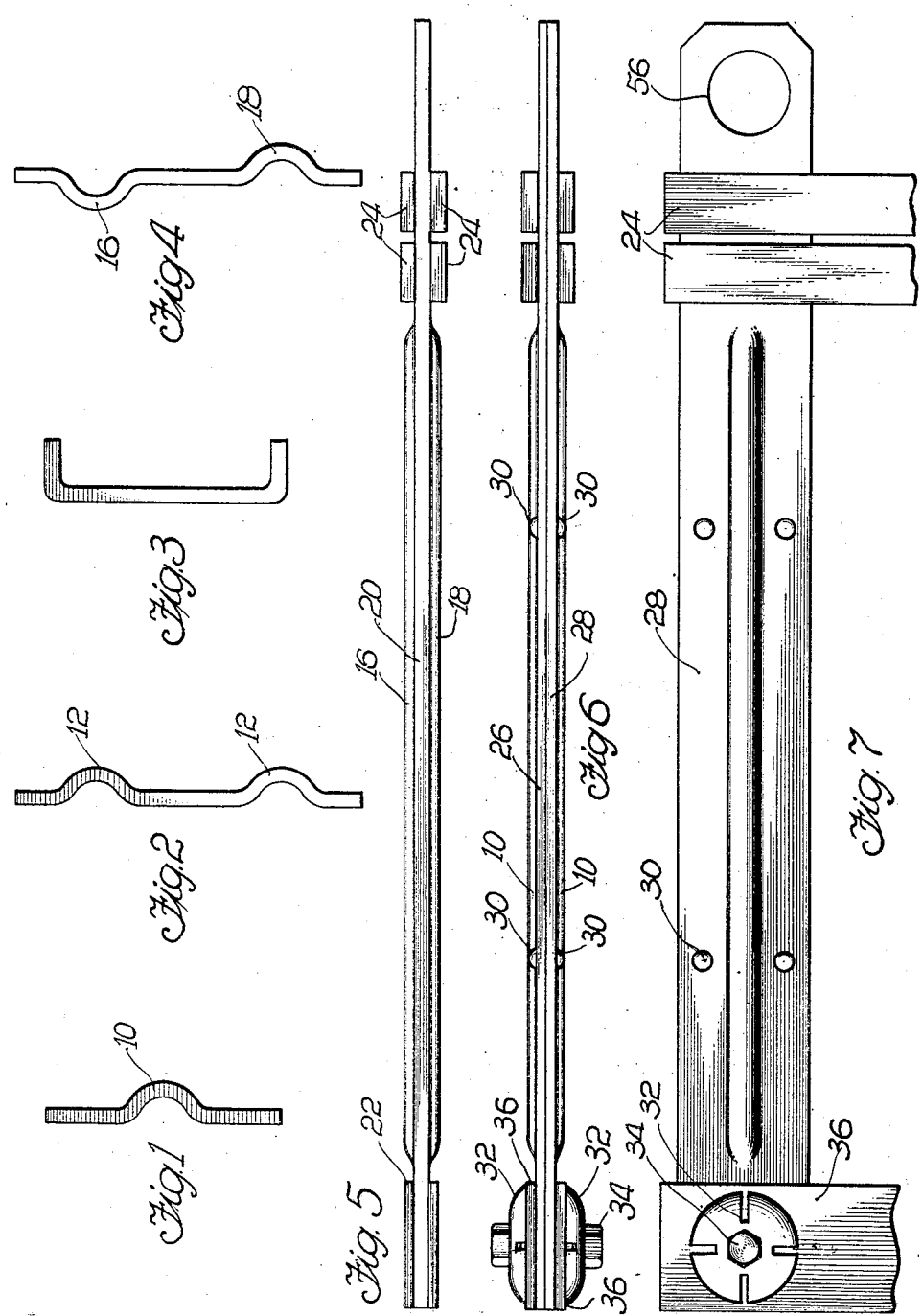

April 28, 1931.  J. A. SHATZER ET AL  1,802,986
ELECTRICAL CURRENT CARRYING EQUIPMENT
Original Filed June 25, 1921  4 Sheets-Sheet 2
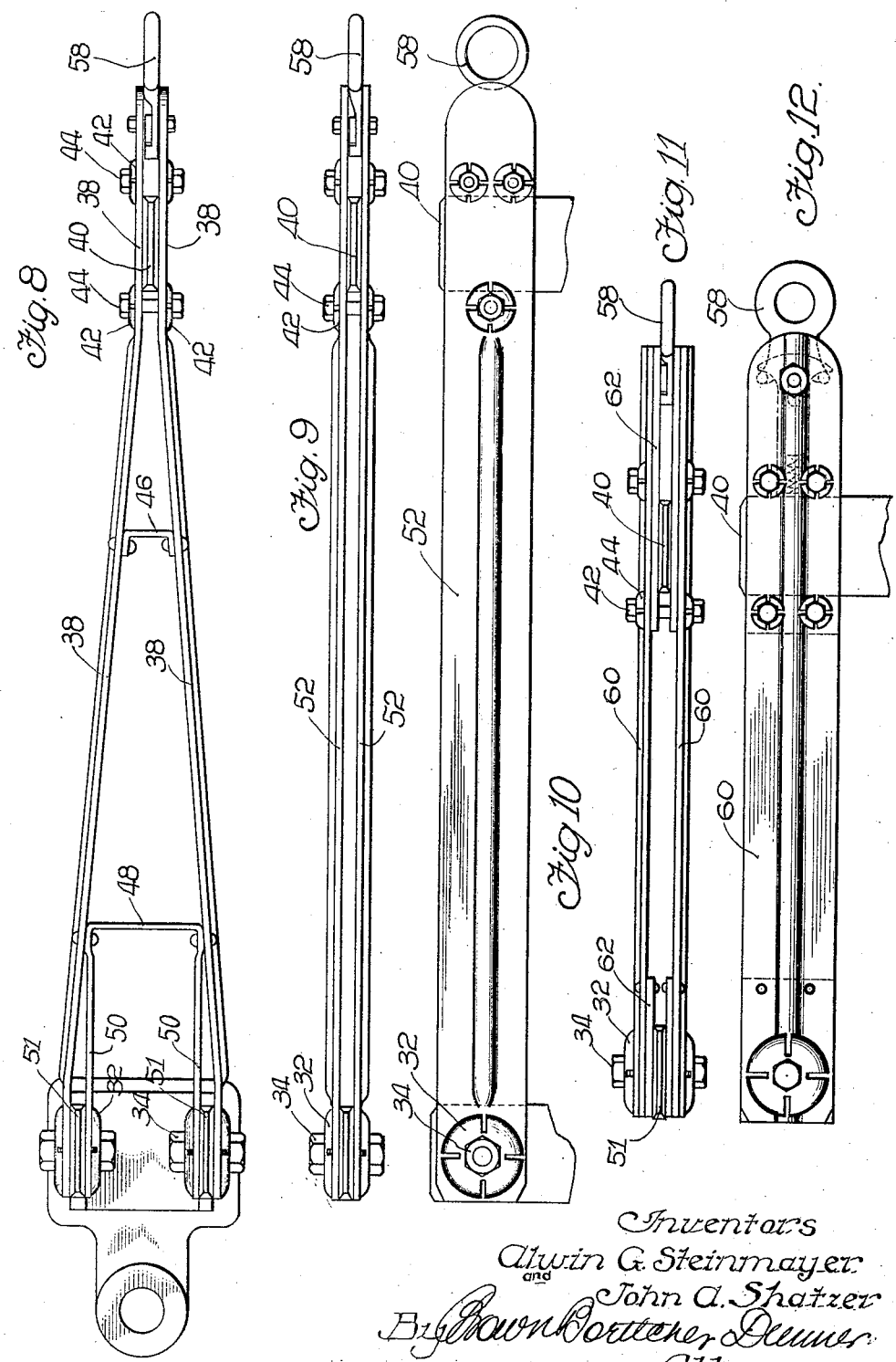

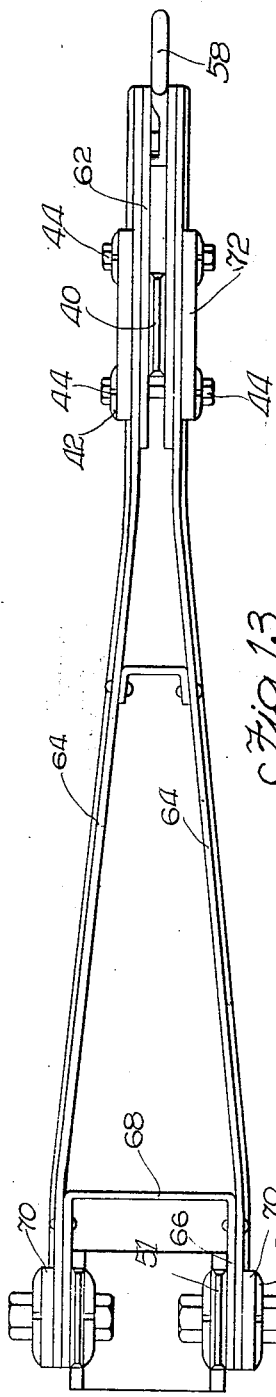
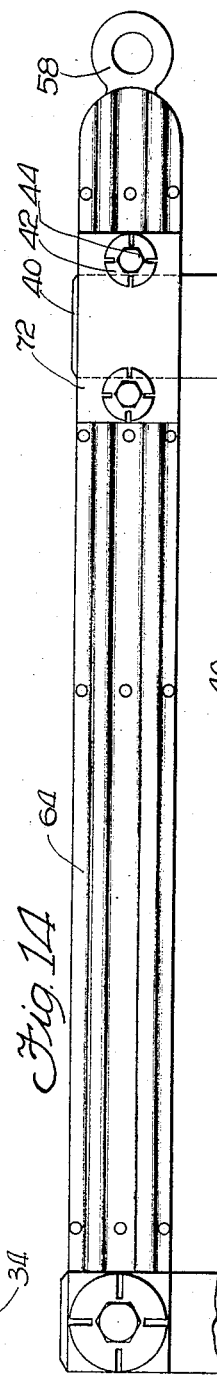
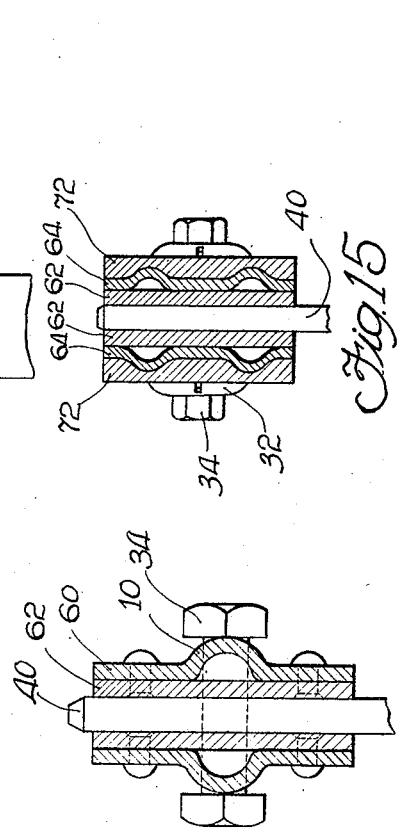
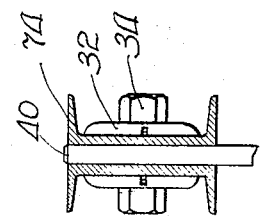

April 28, 1931. J. A. SHATZER ET AL 1,802,986
ELECTRICAL CURRENT CARRYING EQUIPMENT
Original Filed June 25, 1921 4 Sheets-Sheet 4
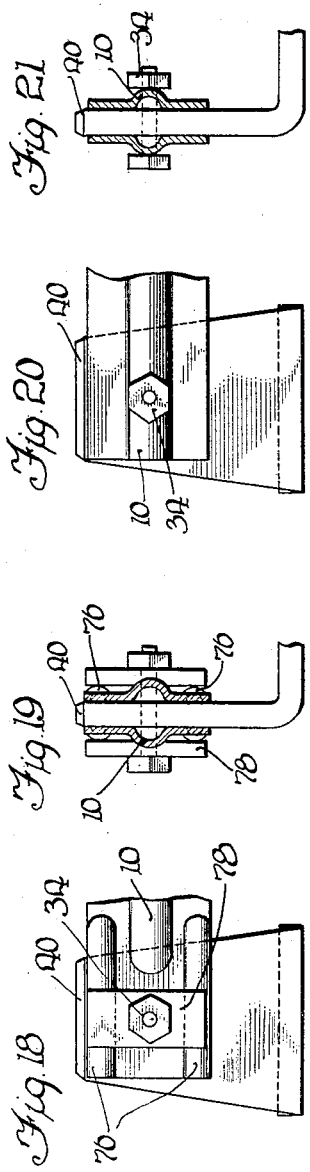
Inventors
Alwin G. Steinmayer
and John A. Shatzer
By Brown Boettcher Dienner
Att'ys Patented Apr. 28, 1931

1,802,986

UNITED STATES PATENT OFFICE

JOHN A. SHATZER AND ALWIN G. STEINMAYER, OF CHICAGO, ILLINOIS, ASSIGNORS TO ELECTRICAL ENGINEERS EQUIPMENT COMPANY, OF CHICAGO, ILLINOIS, A CORPORATION OF ILLINOIS

ELECTRICAL-CURRENT-CARRYING EQUIPMENT

Application filed June 25, 1921, Serial No. 480,444. Renewed May 29, 1928.

Our invention relates to means for carrying and controlling the distribution of electrical currents and more specifically to an improved type of conductor especially useful in high voltage work. The invention is useful in connection with disconnect switches and air break switches employed for high voltage work because of the relatively great gap which the switch blades must span. While our invention is illustrated in connection with the disconnect type of switch, ordinarily employed to open the circuit only when no current is flowing, it may obviously be employed in air break, oil break or other types of switch.

It is also advantageous for bus-bars, switch supports and mountings and switchboard fittings, especially wherever the voltage is high and current relatively low so that the necessary cross sectional area for current carrying purposes does not provide for sufficient mechanical strength and rigidity.

We have observed that in equipment for controlling power circuits of low voltage, the cross section of material necessary in the current carrying elements for current carrying purposes is usually large enough so that a simple section has sufficient rigidity and mechanical strength for satisfactory support and operation of the parts. Where the voltage is high, the minimum air gap which must be maintained at all points in the circuit is primarily a function of voltage only, and in many instances, the necessary section for current carrying purposes does not provide sufficient rigidity in the current carrying elements.

One object of our invention is to increase materially the rigidity of such elements without increasing the amount of material required.

Another object is to provide for the manufacture of parts having such increased rigidity from strips of material of uniform cross section throughout their lengths, whereby units of different sizes can be made up by cutting off suitable lengths from a strip of material of indefinite length.

In addition to the decreased cost of manufacture, the construction of equipment according to our invention has the advantage that renewable contact faces are provided by the same fittings employed to permit the use of strips of material of uniform cross section.

Further objects and advantages of our invention will become apparent as the description proceeds. In the accompanying drawings:

Figures 1, 2, 3, and 4 illustrate four characteristic sections of the types we prefer to employ.

Figure 5 is a plan view of a portion of a switch in which the section shown in Figure 4 is employed, and Figures 6 and 7 are a plan view and an elevation of a portion of a switch employing two strips of the section shown in Figure 1.

Figure 8 is a plan view of a trussed type of switch having spaced blades adapted to engage a stationary blade between them.

Figure 9 is a plan view of a switch having spaced blades in which the trussed construction is not employed, and Figure 10 is an elevation of the parts shown in Figure 9.

Figures 11 and 12 are a plan view and a side elevation respectively of a switch in which blade members of uniform cross sections are employed.

Figure 13 is a view of a trussed type of switch employing blade elements of uniform cross section, and Figure 14 is a side elevation of the parts shown in Figure 13.

Figures 15, 16, and 17 are sectional views illustrating different arrangements of the blades for a spaced blade switch.

Figures 18, 20, 22, 24 and 26 are side views of different ways of corrugating the ends of the blades, and Figures 19, 21, 23, 25 and 27 are end views of the parts illustrated in Figures 18, 20, 22, 24 and 26, respectively.

Figure 28 is a fragmentary view of the brace construction for the type of switch illustrated in Figures 8 and 13; and Figure 29 is a section on line 29—29 of Figure 28.

Referring to the embodiments of our invention selected for illustration, it will be obvious that each of the sections illustrated in Figures 1, 2, 3, and 4 may be readily produced by passing a flat strip of metal between suitable rolls. The section shown in Figure 1 has a single central corrugation 10, and is suitable for switches or fittings of smaller sizes. For larger ones, a wider strip may be employed and two corrugations 12 formed as in Figure 2. The section shown in Figure 2 has one face that will make good contact with a flat surface, but in certain types of construction additional rigidity may be secured by using the section shown in Figure 4 having corrugations 16 and 18, extending in opposite directions from the plane of the main portion of the strip. For certain sizes, we have also found simple channel sections illustrated in Figure 3 to be very efficient. It will be obvious that the strength of any one of the sections illustrated is materially greater than that of a straight strip of the same cross sectional area, and that the difference in rigidity between a straight strip and the distorted strips illustrated is even greater.

In the switches, shown in Figures 5 to 10 inclusive, the ends of the blades are formed flat for suitable engagement with the fixed supports to which they are pivotally connected, and with the fingers with which they make contact. The blade 20 in Figure 5 has the section shown in Figure 4 and is flat at one end for pivotal connection with blades 22, and at the other end for entry between the resilient contact fingers 24. In the switch illustrated in Figures 6 and 7, the switch blade is formed of two plates 26 and 28, each having the section illustrated in Figure 1, the plates being laid with their flat faces adjacent and riveted together by suitable rivets 30. The usual spring washers 32 and bolts 34 may be provided for securing firm engagement between plates 36 and the blades.

In the truss type construction illustrated in Figure 8, it is customary to have spaced knife blades 38 for engaging a single rigid stationary finger 40. In this construction, bolts 44 having spring washers 42 operate to hold the blades 38 in firm frictional engagement with the blade 40 when the switch is in closed position. These blades may be suitably braced by one or more cross pieces, such as the intermediate cross piece 46 and a rear cross piece 48 formed as shown of a U-shaped strip of metal, the arms 50 of which are clamped to the pivotal support 51 to secure additional contact therewith.

The spaced blade type of construction may also be employed without arranging the blades to diverge and form a truss. In Figures 9 and 10 we have illustrated blades 52 lying in parallelism throughout their lengths but spaced apart to engage a rigid, stationary contact 40 as in Figure 8. Any of the above switch elements may carry any preferred type of eye for opening the same. In Figure 7, we have illustrated an eye formed by making a hole 56 in the ends of the movable blades projecting beyond the resilient contact fingers. In Figures 8, 9 and 10 an eye 58 is provided adapted to actuate automatic locking means housed between the spaced blades of the movable switch elements. As this locking means is disclosed in the co-pending application of E. H. Jacobs, Serial No. 289,922, filed April 14, 1919, and per se forms no part of our present invention, detailed disclosure thereof is deemed unnecessary.

Movable switch elements of the type illustrated in Figues 5 to 10 inclusive may readily be manufactured from flat strips of metal by stamping or otherwise forming the corrugations in the appropriate portions of the blade, leaving the ends flat. They may also be made by taking strips of material corrugated throughout and flattening the ends to restore them to their original shape, but we consider this method somewhat less desirable, as it is impossible to secure as good electrical contact with surfaces which have been bent and then flattened again. For blades of very large size, neither of these methods of forming the blade is practicable and we prefer to employ an improved method of construction involving the use of strips of material of indefinite lengths and uniform cross section, which strips are cut into the desired lengths and provided when necessary with special fittings for making contact with the supports and contact fingers on the switch. We have also found that even for the smaller sizes where it is not absolutely necessary to employ the last mentioned method, its use is distinctly advantageous, resulting in marked economy.

Figures 11 and 12 illustrate a switch made up of spaced blades 60 having in this instance the section illustrated in Figure 1, and equipped with facing plates 62, at the ends of the blades, which facing plates are suitably fastened to the blades and provide flat faces for good electrical contact with the supports 51 and blades 40. This type of construction provides as good contact as the type where the ends of the blade are originally flat, but it permits switches to be made up in any desired size from stock.

Figures 13 and 14 illustrate the application of our improved method to the trussed type switch. The blades 64 illustrated have a section similar to that shown in Figure 2 and are provided with facing means 66 formed integral with the cross piece 68 for bracing the base of the truss. In this type of construction, we prefer to employ blocks lying against the faces of the blades under the spring washers 32, which blocks are shaped to fit the irregularities of the section to which they are applied, and provide a firm seat for the spring washers. In Figure 13, blocks 70 are shown lying on the outer surfaces of the blades 64. The blocks 72 provided at the other end preferably extend continuously from bolts 44 on one side of the fingers 40 to bolts 44 on the other side, although, if desired, separate blocks may obviously be employed.

Figures 16 and 17 illustrate alternative methods of securing flat contact faces in a spaced type switch and are obviously applicable to any of the various types of construction hereinbefore illustrated. When channel shaped blades 74 as in Figure 16 are employed, they may be placed back to back as illustrated and no facing plates will be necessary.

The section shown in Figure 1 may sometimes be employed under such conditions that the resilience of the corrugations 10 make it possible to omit the spring washer 32. We have illustrated this arrangement in Figure 17.

The use of facing plates also makes it possible to renew the contact surfaces by replacing the facing plates instead of the blades themselves.

When the blades are stamped various special forms of corrugation for the ends may be employed. In Figure 18 the corrugation 10 terminates at a distance from the pivotal axis and replaced by spaced corrugations 76 slightly overlapping the main corrugation. This makes is possible to use flat strips 78 in place of spring washers.

In Figure 20 corrugation 10 provides sufficient resilience and as the density of current flow is small, facing plates such as 62 have been omitted.

In Figure 22 a central rib 80 is positioned between ribs 76. The central rib is smaller and therefore of less height than ribs 76, but the size of spring washer 32 is such that its edges rest on ribs 76 level with the top of rib 80 to provide four points of contact.

In Figure 24 a spring washer is mounted on a blade with the section of Figure 1 by means of a block 82 shaped to fit the blade. In Figure 26 a flat block 84 takes the place of rib 80 in Figure 22, to space the spring washer 32 from the blade.

The truss type switches of Figures 8 and 13 may be further stiffened by employing cross braces 86 of the same cross section as the switch blades bent so that corrugations 10 nest into each other, see Figs. 28 and 29.

The principles of our invention are not limited in their application to movable elements, but may obviously be applied to the construction of any current carrying element where a simple section of sufficient area for current carrying purposes would not be of sufficient rigidity. For instance, by using bus-bars of irregular cross sections the spans between successive supports may be increased, and the number of supports required correspondingly decreased. This means a saving in a different part of the equipment from that in which the invention itself is embodied.

Without further elaboration the foregoing will so fully explain the gist of our invention, that others may, by employing current knowledge, readily adapt the same for use under various conditions of service, without departing from certain features of the invention which may properly be considered the essential items of novelty involved, which items are intended to be defined and secured to us by the following claims.

We claim:

1. In combination, a switch blade having a longitudinal corrugation, a contact finger, and a contact element fastened to the said blade over the said corrugation and providing a substantially flat surface for the blade to contact the said finger.

2. In combination, a switch blade having a corrugated portion, a contact element, and means for pivotally connecting one end of the said blade to the said contact element, the said means passing through the blade, the said corrugated portion of the blade serving to resiliently urge the blade toward the contact element.

3. In combination, movable switch blades diverging to form a truss structure, said blades being corrugated longitudinally, and a combined cross brace for said truss structure and spacing member for said blades comprising a metallic element extending across from one blade to the other to brace the truss structure and also extending alongside the blade in contact therewith and in contact with an element for delivering current to the said blades.

4. In combination, a pair of movable switch blades diverging to form a truss sturcture, said blades being corrugated longitudinally, a pivot for the said pair of blades, and a combined cross brace and spacing member for said blades comprising a metallic element extending across from one blade to the other to brace the blades and also extending alongside the blades in contact therewith and in contact with the pivot.

5. In combination, a pair of corrugated switch blades, said corrugations extending longitudinally throughout the length of the blade, a contact element, and plates secured to each side of the place where the said blades contact the said element.

6. In combination, an electrical switch blade comprising a wrought copper bar having a longitudinal corrugation and a block attached to one end of the said blade, the said block being provided with a depression of the same contour as the corrugation and in which the said corrugation fits.

7. In combination, a pair of electrical switch blades comprising wrought copper bars each having a longitudinal corrugation, and a brace for strengthening and separating the said switch blades comprising a bent metallic strip of material provided with a corrugation corresponding to that of the blades and adapted to fit in the said corrugation of each of the said blades.

8. In combination, a pair of spaced electrical switch blades, each comprising a wrought bar provided with a corrugation, an electrical contact element intermediate the blades to which the blades are pivotally attached, the said corrugation causing the blades to be resiliently urged toward the contact element, and an electrical contact finger, the said blades being adapted to be moved about the pivot into electrical engagement with the said finger.

9. In combination, a contact member, a relatively thin metal blade movable into and out of engagement with said contact member, said blade having a flat inner side for presentation to the contact member and having a stiffening corrugation extending out of the plane of the blade outwardly from the outer side thereof and substantially normal to the path of movement of the blade.

10. In combination, a contact member, a relatively thin metal blade, movable into and out of engagement with said contact member, said blade having a flat inner side for presentation to the contact member and having a stiffening corrugation extending out of the plane of the blade outwardly from the outer side of the blade and disposed wholly outwardly from the flat inner side of the blade.

11. As an article of manufacture, a relatively thin metal switch blade having a flat inner side for presentation to a contact member and having a stiffening corrugation extending outwardly from the outer side of the blade and disposed wholly outwardly of said flat inner side.

12. As an article of manufacture, a relatively thin metal switch blade having a flat inner side for presentation to a contact member and having a stiffening corrugation extending out of the plane of the blade, outwardly from the outer side thereof and substantially normal the path of movement of the blade.

13. In combination, a contact member, a relatively thin metal blade movable into and out of engagement with said contact member, said blade having a flat inner side for presentation to the contact member and having a stiffening corrugation extending out of the plane of the blade outwardly from the outer side of the blade and disposed wholly outwardly from the flat inner side of the blade, said corrugation extending longitudinally of the blade between the opposite longitudinal edges of the blade with the relatively thin wall of the blade laid in a common plane on opposite sides of the corrugation.

14. As an article of manufacture, a relatively thin metal switch blade having a flat inner side for presentation to a contact member and having a stiffening corrugation extending outwardly from the outer side of the blade and disposed wholly outwardly of said flat inner side, said corrugation extending longitudinally of the blade between the opposite longitudinal edges of the blade with the relatively thin wall of the blade laid in a common plane on opposite sides of said corrugation.

In witness whereof, we hereunto subscribe our names this 16th day of June, 1921.

JOHN A. SHATZER.
ALWIN G. STEINMAYER.